United States Patent [19]

Lawson et al.

[11] 3,856,982

[45] Dec. 24, 1974

[54] TELEPHONE DIALING ARRANGEMENT

[75] Inventors: Anthony Newton Lawson, London; Camilo Manasala Tabalba, Harlow, both of England

[73] Assignee: International Standard Electric Corporation, New York, N.Y.

[22] Filed: Apr. 26, 1973

[21] Appl. No.: 354,837

[30] Foreign Application Priority Data

May 11, 1972 Great Britain .................... 22131/72

[52] U.S. Cl. .............................. 179/90 K, 179/90 R

[51] Int. Cl. ............................................ H04m 1/44

[58] Field of Search ......... 179/90, 27 F, 90 R, 90 K

[56] References Cited

UNITED STATES PATENTS 3,454,726 7/1969 Gasser .............................. 179/90 K 3,482,058 12/1968 Guennou .......................... 179/27 F 3,601,552 8/1971 Barnaby et al. ................... 179/90 B 3,787,639 1/1974 Battrick ........................... 179/90 K

OTHER PUBLICATIONS

Pushbutton Unit for Electronic Pulse Dialling, Ericsson Review, Vol. 49 (1972), No. 2 (pp. 56–59).

*Primary Examiner*—Kathleen H. Claffy
*Assistant Examiner*—Gerald L. Brigance
*Attorney, Agent, or Firm*—John T. O'Halloran; Menotti J. Lombardi, Jr.

[57] ABSTRACT

This push-buttom unit replaces the dial of a telephone instrument, and the push-button operation enters "dialled" digits into an MOS circuit whose outputs operate relays. One of these relays repeats the digits to line in conventional impulse train form, while the other deals with "off normal" dial functions. The electronics is line powered.

5 Claims, 5 Drawing Figures

PATENTED DEC 24 1974

3,856,982

SHEET 3 OF 4

TELEPHONE DIALING ARRANGEMENT

This invention relates to "outpulsing" circuits for use with telephone subscriber's instruments.

It has become fashionable to replace the dial of a telephone subscriber's instrument by a push-button unit, especially where voice frequency signalling is used. However, it is considered desirable to be able to offer the facility of push-button "dialling" to subscribers connected to existing exchanges which can only accept impulse trains such as used in Strowger-type exchanges. Hence the object of this invention is to provide an out-pulser which can derive impulse trains from the outputs of a push-button unit.

According to the present invention there is provided an outpulsing-unit for a telephone subscriber's instrument of the type having a push-button unit, which includes an electronic store into which the digits corresponding to the push-buttons operated by the subscriber are entered in the same order as that in which the push-buttons are operated, pulse generation means adapted to generate pulses at the rate and of the characteristics acceptable by an exchange to which the instrument is connected, distribution means for transferring the digits in said store one after the other to a control counter, means under control of said counter to issue an impulse train for each digit transferred thereto, the number of impulses in each said train corresponding to the digital value of the digit in said counter, a connection to an impulsing means over which each said impulse train drives said means so that each said impulse train is repeated to the line to the exchange, connections from said circuit elements to the line so that the outpulsing unit is powered from the exchange, and a capacitor connected to the line and to the out-pulsing unit, which capacitor is charged from the line while the latter is looped and by its charge maintains the power supply to the outpulsing unit during break impulses.

Embodiments of the invention will now be described with reference to the drawings, in which:

FIG. 1 shows schematically one form of outpulsing unit according to the invention, FIG. 2 is a block diagram of the major portion of the circuitry within the block labelled MOS in FIG. 1, FIG. 3 is a block diagram of a second embodiment of the invention, FIG. 4 is a more detailed circuit diagram of the arrangement shown in FIG. 3, and FIG. 5 is a block diagram of a third embodiment of the invention.

DESCRIPTION OF THE PREFERRED EMBODIMENT(S)

Figure 1:
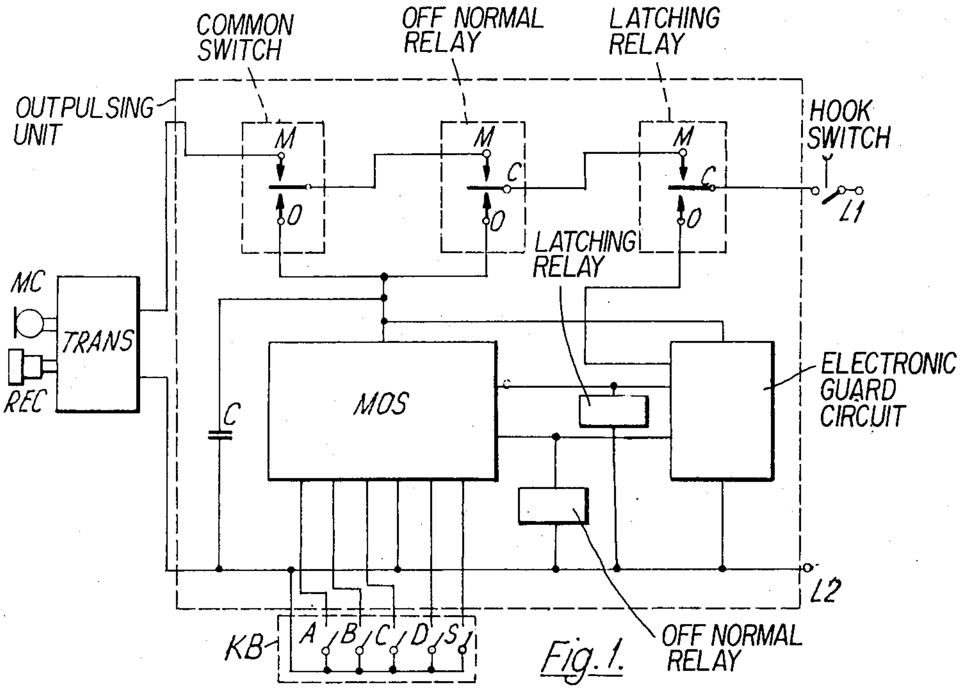

FIG. 1 shows a telephone subscriber's set with a microphone and receiver connected to conventional transmission circuitry TRANS, an out-pulsing unit OP and a keyblock KB. The latter has a five wire input to the block labelled MOS, which is described in more detail later and which converts the push-button operations into digital impulse trains. Of the five wire inputs, the wire controlled by contacts A, B, C and D provide the coded version of the digits, the coding being binary. The fifth wire S is a strobe wire, the condition of which is scanned by the MOS circuitry, although in some cases this may not be needed.

It should be noted that the input from the keyblock KB to the MOS block could have different codings, e.g., a two-out-of-five code, advantageous where some measure of error detection is desired. Again it would be possible for it to be a ten-wire input, which would be non-coded input for the conventional decimal values of the digits.

When a call is initiated by the subscriber, the off-hooking closes the hook-switch contact HS so that the line current flows from the line terminal L1 via the contact HS, contact LDR of a latching relay LDR, contact ONR of an off-normal relay ONR and a common switch CB/CO, all of these then being in their M positions. The transmission circuitry thus receives power from the line and the subscriber hears "dialling" tone.

When the caller commences to operate the push-buttons, each button operation reverses the contact CB/CO so that the MOS block receives power from the line and the capacitor C charges from the line. The changed state of CB/CO disconnects the transmission circuitry from the line, and as a result of the connection of power to the MOS block the latter operates the off-normal relay ONR, which reverses its change-over contact so that MOS and C are powered independently of the contacts CB/CO, which can thus restore to rest when the operated push-button is released.

The charge accumulated on capacitor C is limited by its size, but is such that when the loop is interrupted by the contacts of the latching relay LDR there is enough energy in C to keep MOS operating for the duration of the loop impulse. When LDR is reset and its contact returns to the M position, the lost charge on C is replenished.

Figure 2:
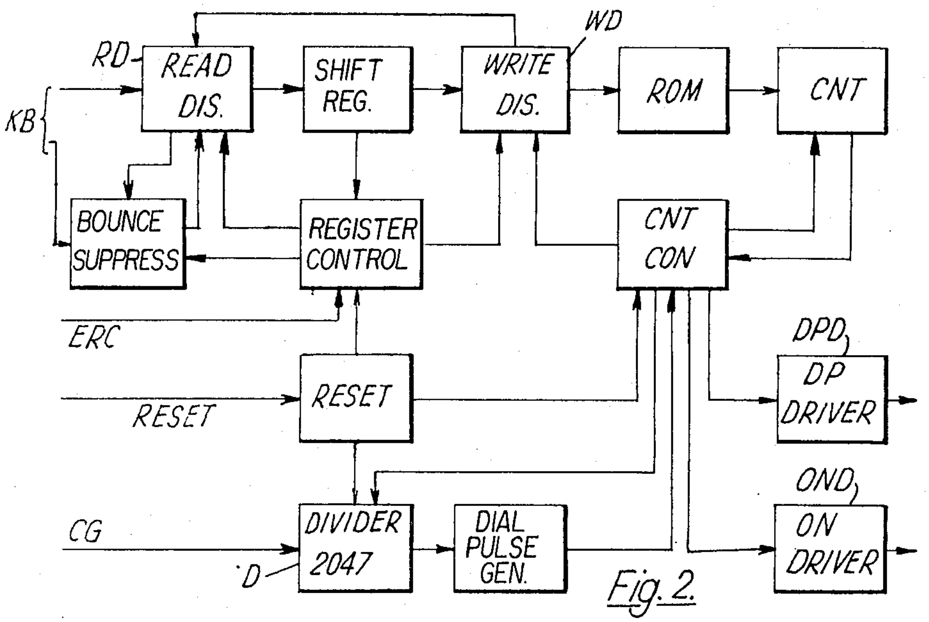

As will be seen from FIG. 2, the block MOS receives and stores the dialled digits, and produces from each digit a train of impulses of suitable rate and characteristics for the exchange. In Great Britain the impulses are at 10 i.p.s., with the loop interruptions nominally of 66.6 milliseconds. Thus each impulse from MOS operates LDR and holds it operated for the appropriate period at the end of which it resets LDR. In the interests of power saving LDR is a latching relay, and is operated by one pulse to initiate a break impulse to the line, and is reset by another pulse to reset the relay to end the pulse to the line. One example of a circuit using a latching relay in this way is described in our British Patent Application No. 42550/71.

As long as the storage portion of MOS contains push-button "dialled" digits, and as long as outpulsing is in progress, the ONR relay mentioned above is held operated so that its change-over contact is in the O position. Finally when there are no longer any digits in the storage portion of MOS and the last "dialled" digit has been outpulsed, MOS resets ONR, which can also be a latching relay, to its rest condition so that the outpulsing unit OP is isolated from the line and from the transmission circuitry TRANS.

The electronic guard circuit EGC contains circuit elements which ensure that before and after "dialling," the contacts of relays ONR and LDR are always in the positions shown in FIG. 1. Such a precaution is necessary as the relays could otherwise be left in any state by mechanical forces or by an electrical fault. In this respect, reference is directed to our above-mentioned British Patent Application.

It should be noted that the two latching relays could be replaced by electronic devices, which would be convenient since the block MOS is also electronic. It would also minimize the risks of faulty operation mentioned above, and may even render the block EGC unnecessary. The block MOS, although assumed to be based on MOS circuitry could be replaced by an equivalent bipolar silicon integrated circuit unit.

The block diagram of FIG. 2 shows the major portion of the circuitry in the block MOS of FIG. 1: there is also a clock pulse source whose output pulses are applied to the terminal CG. The circuitry shown in FIG. 2 is made on a single integrated circuit unit, and is based on the use of MOS devices.

The digits to be dealt with arrive in four-bit parallel binary form from the push-button block over the inputs KB, from which they pass via a read distributor RD to a shift register assembly SRU. This consists of four individual 18 bit shift registers in parallel, so that numbers with up to 18 "dialled" digits can be dealt with. There is also a bounce suppression circuit BSC, which ensures that a dialled digit is only entered once into the registers. Thus contact bounce in a push-button does not cause any spurious recordings.

After each digit is entered into the registers SRU it is stepped once along those registers, under the control of the register control circuit RCC. This also responds to the end of a number by detecting that a certain predetermined period has elapsed without any new digit being received, the detection of "end of number" causing the stored digits to be stepped along the registers in SRU until the first digit is in the right-hand ends of the registers.

The write distributor WD causes the digits stored in SRU to be extracted one at a time from SRU and each such digit is passed to a read-only memory ROM. This latter is used as a decoder, and for each digit transferred to it, it sets a counter CNT in accordance with its value. There is also a clock pulse generator (not shown), which supplies pulses to the input CG to a frequency divider D which divides the frequency by 2047. The output from the divider D goes to a dial pulse generator DPG, whose output is applied to the counter control circuit CNT CON.

When a digit has been placed in the counter CNT, the circuit CNT-CON causes the number of dial pulses from DPG appropriate to its value to be generated and applied to the dial pulse driver DPD. This latter drives the latching relay LDR referred to above. CNT-CON also exerts a controlling influence on the off normal relay ONR via the ON driver OND, this being an additional control to the one which sets ONR when the caller commences to "dial." The means for initially operating ONR are not shown, nor is the clock pulse generator. With the usual 10 i.p.s. "dialling" pulse trains, the clock pulse frequency is 20.47 kHz.

After each digit has been sent, as indicated by CNT-CON, an interdigital pause is timed under the control of CNT-CON, and a new digit is shifted from WD via ROM (with conversion) to CNT so that the next digit is sent out. The control of digit sending can be in several ways. Thus the actual value of the digit can be set into CNT, and its setting reduced by one for each pulse emitted by DPD. Then when CNT-CON notes that CNT has returned to zero, the interdigital pause can commence. Alternatively, the complement of the digit can be placed in CNT, with each pulse sent adding one to its setting. In this case CNT-CON detects that a digit has been fully sent when CNT assumes its maximum setting.

When the circuit is initially taken into use, an input is applied over the external reset lead to the RESET circuit. This in turn applies a signal to CNT-CON as a result of which all units are reset to their zero states. There is also an external control input for RCC.

The code used with this circuit unit is as set out in the table:

| Digit Value | Code | Digit Value | Code |
|---|---|---|---|
| 1 | 0000 | 6 | 0110 |
| 2 | 1000 | 7 | 0001 |
| 3 | 0100 | 8 | 1001 |
| 4 | 0010 | 9 | 0101 |
| 5 | 1010 | 0 | 1100 |

Figure 3:
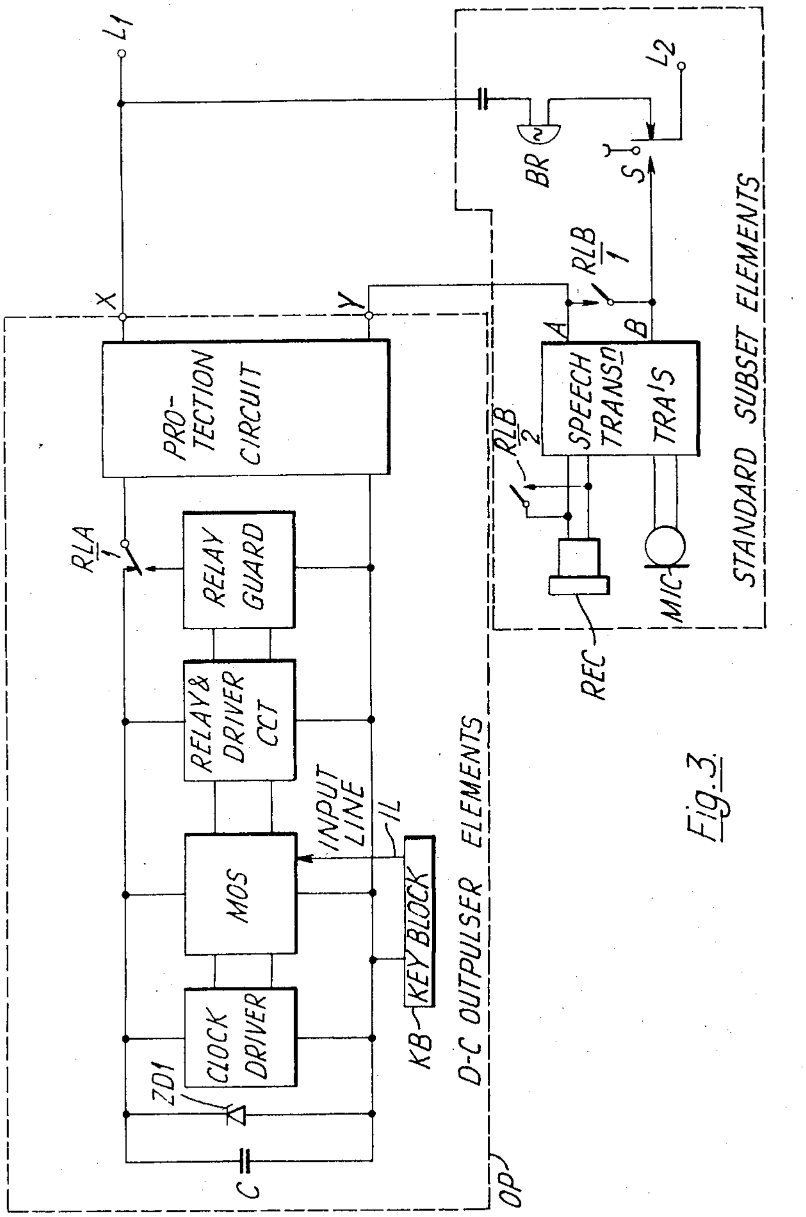

In the second embodiment, FIG. 3, the outpulsing unit OP is in series with the telephone portion. This latter includes all the usual items, such as the microphone MIC, the receiver REC and the transmission circuitry TRANS.

During ON-HOOK conditions the line terminals L1 and L2 are connected to the bell ringer BR via a capacitor. As soon as the subscriber lifts the handset, i.e., in the OFF-HOOK condition, the bookswitch S disconnects the ringer BR and the subscriber loop is completed through the outpulser terminals *x* and *y*. The capacitor C, which serves a similar function to the capacitor C in FIG. 1, is charged to the Zener voltage defined by ZD1 at a rate determined by the line resistance and the exchange battery and feed bridge resistance. The MOS unit is reset when the voltage across the capacitor reaches the threshold level of the MOS gates, provided that the CLOCK DRIVER has itself reached the required voltage level.

The KEYBLOCK KB has an input line IL to the MOS. Although in FIG. 3 only one line is shown, in principle, this would be a number of lines dependent on the coding used. Thus it could be 10 lines where each line corresponds to a digit value, i.e., 0 to 9. the MOS unit (FIG. 2) accepts five input lines, which consist of four data lines coded in the keyblock itself, the coding being set out in the above table. The fifth line is a strobe (as in FIG. 1), used by the MOS to scan for the presence of the data input. Hence the data input must always precede the strobe. There is no restriction on the speed of data entry by a human operator.

The MOS "remembers" the input digits in a store (see FIG. 2) and outpulses as soon as it detects a digit in the store. There is a delay known as Predigital Pause. While outpulsing, the MOS can accept data input, as long as there are never more than 18 digits in the store. The digits outpulsed are cleared from the store. A useful option is the facility for entering and holding all digits of a number (up to 18 digits) in the store, and releasing them by giving a start signal to the MOS. During outpulsing, one output of the MOS drives a relay via the Relay and Driver Circuitry whose contacts control attenuation of the receive path of the speech circuit to prevent unpleasant impulsing noises reaching the subscriber's ear. This is equivalent to the off-normal contacts of a standard dial.

Figure 4:
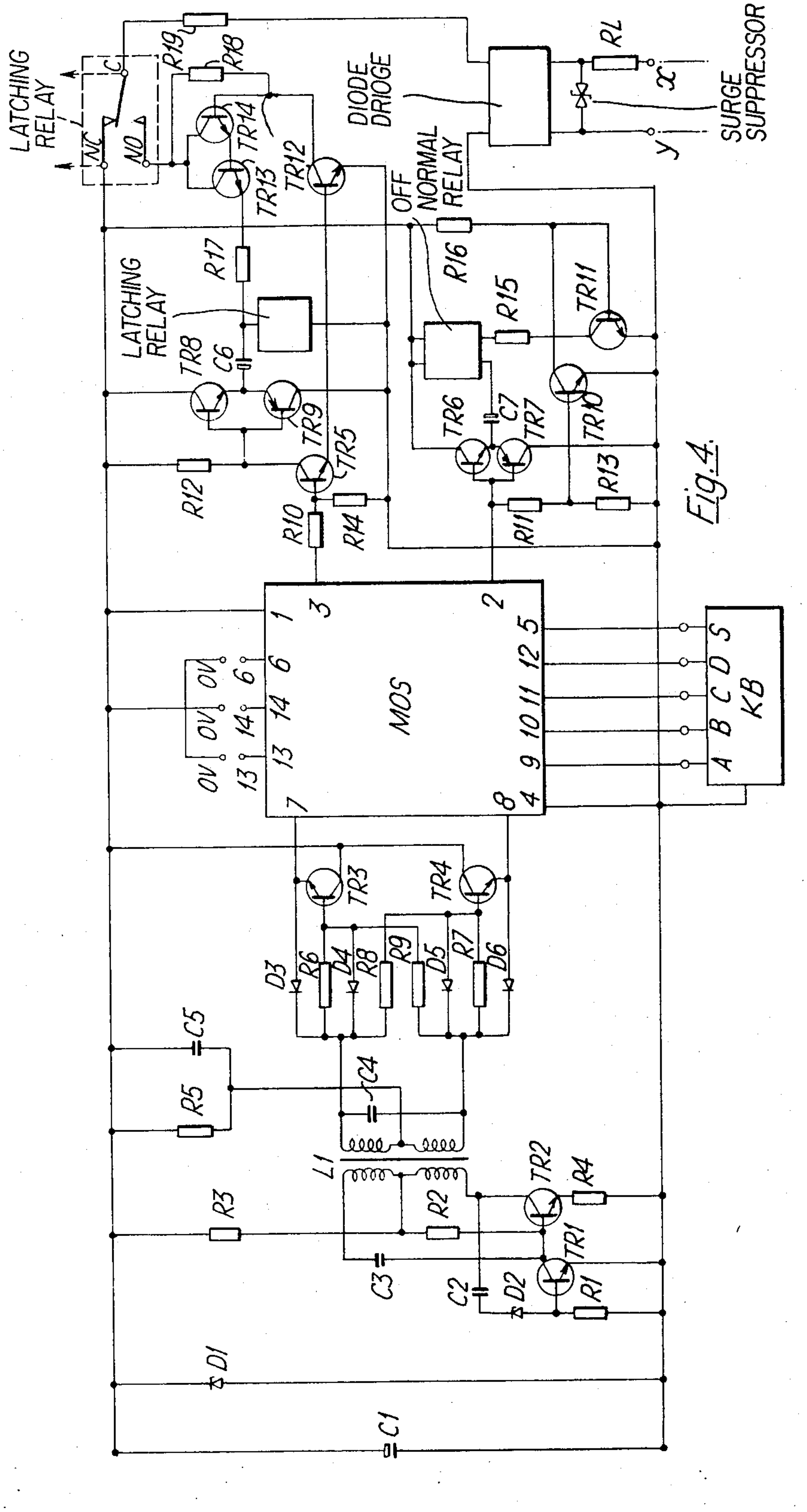

The operation of the RELAYS and their DRIVE and GUARD circuits is now explained, see FIG. 4.

The PROTECTION circuit consists of a diode bridge BS1 to protect against polarity reversals of the exchange battery, and there is a surge suppressor SS and limiting resistor RL to protect against induced high voltage transients. The same suppressor SS protects against ringing voltage in case of ring-trip failure.

As seen in FIG. 3, the outpulser is in series with a standard subset, so the loop is: L2; Hook Switch S; speech circuit B to A; outpulses *y-x;* then L1. The subscriber's line is connected to terminals L1 and L2, and the ringer circuit is across L1 and L2 during ON-HOOK condition via S. Across the speech circuit is one of the OFF-NORMAL relay contacts RLB/1. This corresponds to contacts or ONR (FIG. 1). Normally this contact, which closes just before the breaking of the impulsing relay contact RLA/1, is adequate to mute or attenuate the impulse noises. However, cases occur where an additional contact RLB/2 may be desirable. RLB/1 also helps to reduce the voltage drop during the make periods of the impulsing relay contact RLA/1.

Reverting to FIG. 4, the clock driver consists of an oscillator circuit TR2, L1, C3, C4, its bias and amplitude regulator consisting of TR1, D2, C2, R1, R2, R3 and R4. The amplitude is stabilized by injecting a base current into TR1 whenever the collector voltage of TR2 exceeds the Zener (D2) voltage (6.8 volts) breakdown. The frequency of oscillation is controlled by C4.

The output stage is so designed that only negative going half-sine waves are applied to the MOS at its terminals 7 and 8. The two half waves are displaced by a small period due to the self-bias *d-c* shift provided by R5 and C5. Consider just one of these cycles, say, via transistor TR4. First assume no voltage drop across R5, i.e., the center tap of the transformer L1 is at zero potential. As the lower end of the secondary of L1 starts going negative, the upper end starts to go positive. Therefore diodes D3 and D4 are reverse biased, D5 is forward biased via R8, and the MOS capacitive load at its terminal 8 is charged via D6 while TR4 is held non-conducting. At the peak of the negative swing at the lower end of L1, the capacitive load is charged to the peak voltage. The same current through D6 is used at the same time to charge C5 to have the d.c. shift between the two phases. As the voltage at the lower end of L1 starts to fall D5 is reverse biased and TR4 becomes an emitter follower whose base current is supplied via R8. Then as the voltage at the lower end of L1 crosses zero and becomes positive, it puts TR4 into an inverse saturated mode, which completely discharges the capacitive load at terminal 8 of the MOS. Thus the base-collector diode of TR4 becomes forward biased, and the emitter of TR4 is clamped to zero potential.

The role of TR3 is the same as that of TR4, when the voltage at the upper end of the secondary of L1 is in the negative half-cycle. Thus a second negative half-wave voltage is developed at terminal 7 of the MOS. Resistors R6 and R7 serve to leak away from the bases of TR3 and TR4 any small currents during the periods of very low voltages between pins 1 and 3 and the reference zero potential.

The "dialled" data is entered via the keyblock KB: e.g., in the Coding Table, it is seen that the code for number 7, for example has the fourth bit D at 1, which means a contact closure to the negative side of the 6.8 volt Zener. The STROBE S contact closure should immediately follow and not precede the coding contact closure.

There are several options for the particular MOS IC shown, and the next Table shows three performance options: Break-to-make ratio, Inter digit pause and Inhibit function. For particular subscriber set connections, there are two options: one or two off-normal ONR contacts, and where the exchange battery voltage is 24 volts.

OPTION TABLE

| FUNCTION | PARAMETER | STRAP WIRING INSTRUCTION |
|---|---|---|
| RATIO | 2:1 | NONE |
| BREAK: MAKE | 1.6:1 | 14 TO OV |
| INTERDIGIT | 230 ms | NONE |
| PAUSE | 833 ms | 13 TO OV |
| INHIBIT | NOT REQUIRED | NONE |
| | REQUIRED | 6 TO INHIBIT SWITCH |
| ONR/2 | NOT REQUIRED | M TO N AND USE ITEM 4 |
| | REQUIRED | USE ITEM 1B |
| EXCHANGE BATT VOLTS | 48v NOMINAL | NONE |
| | 24v NOMINAL | CHANGE R17 FROM 10K TO 3.3K |

The outpulsing speed is at 10 impulses per sec. (10 ips) but for systems requiring 20 ips, the clock frequency is doubled to 40.94 kHz by changing the value of C4. In this case, the Interdigital pause options are halved, i.e., ½ × 430 ms and ½ × 833 ms. It is also worth noting that in an improved version of the MOS unit, the Inhibit terminal 6 may be used to increase the Predigital pause from about 39 ms to greater than 300 ms by adding a capacitor (not shown) to terminal 6 and the reference zero potential. The upper limit of the Predigital pause cannot be precisely defined in this case. It is probably not desirable to have a lower limit greater than 300 ms because a more complex external circuit is needed to add to terminal 6. The MOS unit can of course be redesigned to eliminate this complication.

The reset logic inside the MOS (see FIG. 2) is operated simply by the voltage across C1 (which corresponds to the capacitor C, FIG. 1) at terminal 4. This is possible because the operate time of the clock driver is much faster than the rise time of the voltage across C1 to reach the MOS gate threshold.

The impulsing or loop disconnect relay, LDR, is driven by TR8 and TR9 transistors. The voltage waveforms at the junction of their emitters are of the required pulse repetition rate and break-to-make ratio, following and inverting the waveform output at terminal 3 of the MOS. To conserve power, this waveform is differentiated by C5 and the resistance of the relay coil is such that the negative and positive going spikes of current operate the relay LDR. During impulsing, whenever the LDR/1 contact is a C-NO, the transistor TR12 is saturated, thus switching off transistors TR13 and TR14 which are the guard circuit transistors.

The guard circuit is effective before and after dialling. The guard is necessary to ensure that the LDR/1 contact is always in its correct state. An incorrect state occurs when this contact is at C-NO before or after dialling. In this case, since TR12 is switched off, TR13 and TR14 are active, and inject a current to the LDR relay such as to restore the LDR/1 contact to its normal C-NC position. The base current of the TR14 and the collector currents of TR14 and TR13 are supplied from the exchange battery. This operation guarantees independence from the state of charge on capacitor C1, because if the break occurs during installation, for example, there is no charge available from this capacitor.

The use of a change-over type for the LDR relay is unnecessary. The C-NO terminals may be short-circuited without affecting the principle of operation. In fact, it could only be more economical to use a two-terminal relay.

The driving transistors of the off-normal relay ONR are TR6 and TR7, and the same principle is used to drive ONR as for LDR. That is, C7 and the relay coil resistance differentiates the output of the drive transistors whose waveform follows that of the MOS at its terminal 2. TR 10 is saturated during this period, hence switching off TR11, which latter is the guard for ONR. Before and after dialling, its collector current provides an electrical bias to ONR which in effect converts it from a relay into a mono-stable relay. Resistor R15 limits the bias current.

With reference to FIG. 3, the off-normal contact RLB/1 reverts to the closed position when the switch S returns to the ON-HOOK condition because of the particular logic design of the MOS. This enhances even more the operation of the exchange relays during the initial post lift-off period. The contact RLB/1 opens immediately when TR11 collector current reaches the minimum bias current level.

There are three occurrences or fault conditions which the electronic circuits have to be protected against, which are (a) exchange battery polarity reversals, (b) ring-trip failure, and (c) high voltage transients.

In FIG. 4, the diode bridge BS1 protects against the battery reversals (see also our above-mentioned British Patent Application) so that the correct polarity is always applied to the electronic circuits. BS1 should have a reverse voltage breakdown rating higher than that of SS, the high voltage suppressor. This suppressor SS, which has a 70 volts breakdown, clamps the high voltage surge. Most of the voltage drop is across RL. The suppressor is bi-directional and can pass high currents of short duration as would be encountered during line surges due to lighting. The same suppressor diode with RL can dissipate the ringing power if the ring-trip relay in the local exchange fails to operate. The resistor R19 limits the transient current S rectified by BS1.

It is worth noting that transient high currents during OFF-HOOK condition also pass through the Speech Transmission Circuit when RLB/1 is at its normally open state, i.e., the PROTECTION circuit described above does not protect the Transmission Circuit. Standard subset elements which are passive elements, are not normally equipped with such protection, because they are "rugged" enough to withstand such high current transients. Unfortunately, this is not the case with active semiconductor elements.

Figure 5:
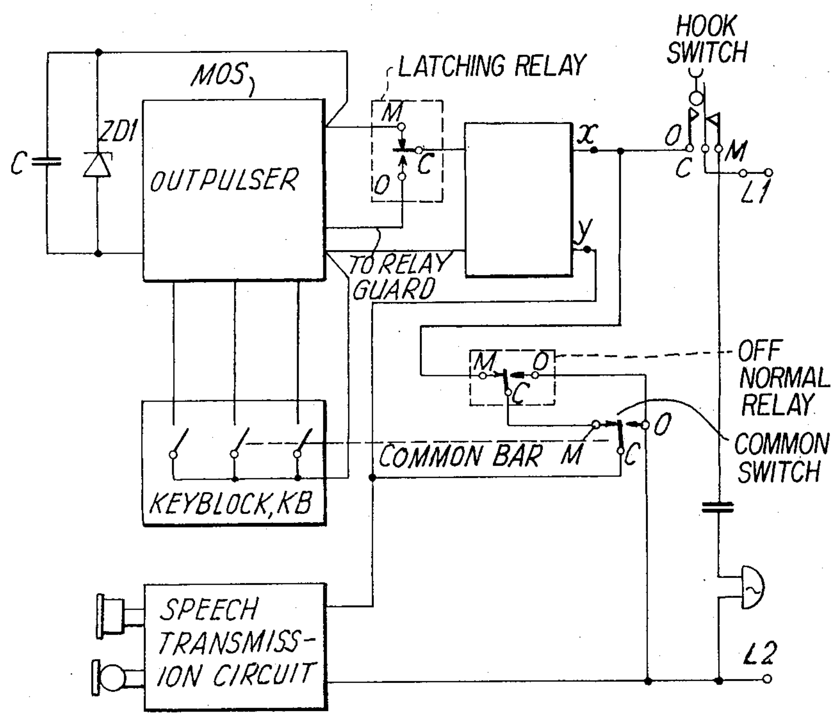

Another arrangement for connecting the outpulser is shown in FIG. 5. Here the outpulsing unit (OP) is normally short circuited so that the speech transmission circuit is the only electrical component connected to the line when the HS contacts C and O are closed. The short circuit across terminals *x* and *y* is completed by the ONR relay contacts M and C, and the common bar CB/CO contacts M and C. As already mentioned in respect of FIG. 1, CB/CO is controlled from the keyblock KB.

When a KB button is operated, the data contacts and strobe contacts enter its digit value to the MOS. Almost simultaneously, the speech transmission circuit is short circuited by the CB/CO contacts C and O, and the available line power is transferred to the OP unit, i.e., *x* and *y* are now connected to L1 and L2 via the hook switch HS so that C charges to the voltage determined by ZD1. The MOS and the electronic circuits associated with it can now operate. In FIG. 5 a contact additional to those already mentioned is introduced by the KB common bar. This is the Inhibit contact which ensures that the ONR relay keeps the speech transmission circuit in a short circuit condition and terminals *x* and *y* connected to the line, as soon as the CB/CO contact C changes over to M when the KB button is released. While there is data in the register SRU of the MOS, and the MOS is outpulsing, the ONR relay contacts C and O remain closed and further operation of the KB buttons only enters data and strobe signals.

When the SRU register of the MOS is empty, and the last LDR pulse has been made, the ONR relay contact C changes over to M. This action short circuits the OP unit and speech transmission circuit is again connected to L1 and L2 via the hook switch HS.

It is to be understood that the foregoing description of specific examples of this invention is made by way of example only and is not to be considered as a limitation on its scope.

What is claimed is:

1. An outpulsing-unit for a telephone subscriber's instrument of the type having a push-button unit, which includes an electronic store into which the digits corresponding to the push-buttons operated by the subscriber are entered in the same order as that in which the push-buttons are operated, pulse generation means adapted to generate pulses at the rate and of the characteristics acceptable by an exchange to which the instrument is connected, distribution means for transferring the digits in said store one after the other to a control counter, means under control of said counter to pass an impulse train from said pulse generation means for each digit transferred thereto, the number of impulses in each said train corresponding to the digital value of the digit in said counter, a connection to an impulsing means over which each said impulse train drives said means so that each said impulse train is repeated to the line to the exchange, connections from said circuit elements to the line so that the outpulsing unit is powered from the exchange, and a capacitor connected to the line and to the outpulsing unit, which capacitor is charged from the line while the latter is looped and by its charge maintains the power supply to the outpulsing unit during break impulses.

2. The outpulsing unit as claimed in claim 1 wherein the lifting of the handset closes a hook-switch to connect the unit to the line, wherein on the first push-button operation a common contact operable in response to the operation of any one of said buttons closes to connect the line to said capacitor and to the circuit elements of the unit, and wherein in response to said connection a first relay operates to close a contact to connect the line to said capacitor at said circuit elements independent of said common contact.

3. The outpulsing unit as claimed in claim 1 wherein said impulsing means is a latching relay which is set to its operated state at the commencement of each break impulse and is reset to its non-operated state at the end of each break impulse, and wherein when the impulsing relay is in its operated state its contacts break the loop.

4. The outpulsing unit as claimed in claim 1 wherein digits are entered into the store in an *n*-bit parallel code each bit of which is a 1 or a 0 bit, and wherein said electronic store consists of *n* shift registers in parallel into which the digits are entered, each said shift register having *m* stages where *m* is the maximum number of digits to be catered for in a number.

5. The outpulsing unit as claimed in claim 1 wherein the unit is connected to the line in series with the telephone portion of the subscriber's set, and wherein charging of the capacitor commences immediately the subscriber lifts the handset.

* * * * *